(12) United States Patent
Egashira et al.

(10) Patent No.: US 8,362,149 B2
(45) Date of Patent: Jan. 29, 2013

(54) GOLF BALL MATERIAL, GOLF BALL AND METHOD FOR PREPARING GOLF BALL MATERIAL

(75) Inventors: Yoshinori Egashira, Saitama-ken (JP); Jun Shindo, Saitama-Ken (JP); Eiji Takehana, Saitama-ken (JP); Hiroyuki Nagasawa, Saitama-ken (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 13/325,736

(22) Filed: Dec. 14, 2011

(65) Prior Publication Data
US 2012/0083574 A1 Apr. 5, 2012

Related U.S. Application Data

(62) Division of application No. 12/199,193, filed on Aug. 27, 2008, now Pat. No. 8,106,125.

(51) Int. Cl.
*C08F 267/02* (2006.01)
*C08F 283/00* (2006.01)
*C08L 33/02* (2006.01)
*A63B 37/00* (2006.01)

(52) U.S. Cl. ........ 525/126; 525/125; 525/127; 525/130; 525/154; 525/155; 525/166; 525/168; 525/169; 525/170; 525/179; 525/181; 525/193; 473/378; 473/385

(58) Field of Classification Search .......................... None
See application file for complete search history.

(56) References Cited

U.S. PATENT DOCUMENTS

| | | | |
|---|---|---|---|
| 3,421,766 A | 1/1969 | Chimel et al. | |
| 4,054,455 A | 10/1977 | Schlesinger et al. | |
| 5,274,041 A * | 12/1993 | Yamada | 525/196 |
| 5,306,760 A | 4/1994 | Sullivan | |
| 5,312,857 A | 5/1994 | Sullivan | |
| 6,100,321 A | 8/2000 | Chen | |
| 6,369,125 B1 | 4/2002 | Nesbitt | |
| 6,613,842 B2 | 9/2003 | Rajagopalan | |
| 6,653,382 B1 | 11/2003 | Statz et al. | |
| 6,777,472 B1 | 8/2004 | Statz et al. | |
| 7,026,399 B2 | 4/2006 | Kim et al. | |
| 7,175,545 B2 | 2/2007 | Kuntimaddi et al. | |
| 2003/0073517 A1 | 4/2003 | Ichikawa et al. | |
| 2003/0207996 A1 | 11/2003 | Takesue et al. | |
| 2004/0044136 A1 | 3/2004 | Kim | |
| 2004/0242802 A1 | 12/2004 | Voorheis et al. | |
| 2006/0030668 A1 | 2/2006 | Egashira et al. | |
| 2007/0184916 A1 | 8/2007 | Shindo et al. | |
| 2007/0282069 A1 * | 12/2007 | Egashira et al. | 525/126 |

FOREIGN PATENT DOCUMENTS

| | | |
|---|---|---|
| JP | 2003-180878 A | 2/2003 |
| JP | 2007-029668 A | 6/2007 |

OTHER PUBLICATIONS

"Crosslinking Agents for the Rubber & Plastic Industries," Vanderbilt Varox Brochure, 2010, pp. 1-4.
W.D. Vilar, et al., "Characterization of hydroxyl-terminated polybutadiene," Polymer Bulletin, 1994, pp. 563-570, vol. 33.

* cited by examiner

*Primary Examiner* — David Buttner
(74) *Attorney, Agent, or Firm* — Sughrue Mion, PLLC

(57) ABSTRACT

The invention provides a golf ball material composed of an ionomeric resin composition obtained by melt-blending under applied heat one or more compounds selected from among UV/EB-curable materials with, in the presence of a peroxide, a non-ionomeric thermoplastic resin and an ionomeric resin; or of an ionomeric resin composition obtained by using, instead of the ionomeric resin, an acid-containing polymer base of the ionomeric resin and subjecting the acid-containing polymer composition similarly prepared by melt-blending under applied heat to an acid-neutralizing reaction with a metal ionic species. Methods for preparing such a material, and golf balls which include as a component therein a molding made of the golf ball material are also provided. The golf ball material has a good thermal stability, flow and processability, and can thus be used to obtain high-performance golf balls endowed with an excellent abrasion resistance, scuff resistance, durability and flexibility without a loss of rebound.

12 Claims, No Drawings

GOLF BALL MATERIAL, GOLF BALL AND METHOD FOR PREPARING GOLF BALL MATERIAL

CROSS-REFERENCE TO RELATED APPLICATION

This is a divisional of U.S. patent application Ser. No. 12/199,193, filed Aug. 27, 2008 now U.S. Pat. No. 8,106,125. The entire disclosure of the prior application is considered part of the disclosure of the accompanying divisional application, and is hereby incorporated by reference.

BACKGROUND OF THE INVENTION

The present invention relates to a golf ball material which has a good thermal stability, flow and processability, and from which high-performance golf balls endowed with excellent properties such as rebound, durability, flexibility and scuff resistance can be obtained. The invention also relates to a method for preparing such a golf ball material, and to a golf ball which includes as a component therein a molding made from such a golf ball material.

In recent years, ionomeric resins have been widely used in golf ball materials. Ionomeric resins are ionic copolymers of an olefin such as ethylene with an unsaturated carboxylic acid such as acrylic acid, methacrylic acid or maleic acid, in which some of the acidic groups are neutralized with metal ions such as sodium, lithium, zinc or magnesium. These resins have excellent characteristics in terms of the durability, rebound and scuff resistance of the ball.

At present, the base resins used in golf ball cover materials are generally ionomeric resins, but a variety of modifications are being made to address the constant desire by players for golf balls having a suitable degree of flexibility, a high rebound and an excellent flight performance.

For example, to improve the rebound and flow of ionomer materials, Patent Document 1 (U.S. Pat. No. 5,312,857), Patent Document 2 (U.S. Pat. No. 5,306,760), Patent Document 3 (U.S. Pat. No. 6,100,321), Patent Document 4 (U.S. Pat. No. 6,653,382) and Patent Document 5 (U.S. Pat. No. 6,777,472) describe materials composed of an ionomeric resin to which a large amount of a metallic soap (a metal salt of a higher fatty acid) has been added.

However, the metallic soap in these ionomer materials undergo decomposition and vaporization during injection molding, generating a large amount of fatty acid gases. As a result, molding defects tend to arise. Moreover, the gases that have formed deposit on the surface of the molding, markedly lowering its paintability. Moreover, when such ionomer materials are used as golf ball cover materials, because a large amount of low-molecular-weight metallic soap (a metal salt of a higher fatty acid) is included, the durability of the golf ball significantly deteriorates, making the ionomer material entirely unfit for practical use.

In addition, materials in the form of simple molten mixtures of a flexible thermoplastic resin and an ionomer have been developed (Patent Document 6:JP-A 2003-180878). However, even though such a material appears to be uniform during the production process, there has been some concern that when the material is injection molded to form a particular golf ball layer, the high shear forces in the mold will cause delamination to occur in the layer formed by the molten mixture.

An ionomer material for golf balls which has recently been developed is a homogeneous-phase, high-rebound resilience material that has an interpenetrating polymer network (IPN) structure (Patent Document 7: U.S. Patent Application No. 2004/0044136; Patent Document 8:U.S. Patent Application No. 2004/0242802; Patent Document 9: U.S. Pat. No. 7,026, 399; Patent Document 10: U.S. Pat. No. 7,175,545). The ionomer material is obtained by blending a first ingredient such as an ethylene-(meth)acrylic acid copolymer with a second ingredient that is a different type of thermoplastic resin to form a resin composition, then adding a metal ionic species as a third ingredient so as to neutralize the acid on the first ingredient dispersed in the resin composition. However, in such a production method, if the different type of thermoplastic resin used as the second ingredient is poorly compatible or completely incompatible with the ionomeric resin matrix thereby created, when injection molding is carried out using these materials to form a particular golf ball layer, the high shear forces in the mold sometimes cause delamination to occur within the layer, raising concerns over a decline in the properties of the golf ball. In particular, there has been a tendency for a strong decline in the scuff resistance.

Patent Document 1: U.S. Pat. No. 5,312,857
Patent Document 2: U.S. Pat. No. 5,306,760
Patent Document 3: U.S. Pat. No. 6,100,321
Patent Document 4: U.S. Pat. No. 6,653,382
Patent Document 5: U.S. Pat. No. 6,777,472
Patent Document 6: JP-A 2003-180878
Patent Document 7: U.S. Patent Application No. 2004/0044136
Patent Document 8: U.S. Patent Application No. 2004/0242802
Patent Document 9: U.S. Pat. No. 7,026,399
Patent Document 10: U.S. Pat. No. 7,175,545

SUMMARY OF THE INVENTION

It is therefore an object of the present invention to provide a golf ball material which has a good thermal stability, flow and processability, and moreover which, when injection-molded and used as a golf ball component, is able to suppress delamination within a golf ball layer and thus enables high-performance golf balls endowed with excellent properties such as flexibility, durability and scuff resistance to be obtained without a loss of rebound. Another object of the invention is to provide a method for preparing such a golf ball material. A further object of the invention is to provide a golf ball which includes as a component therein a molding made from such a golf ball material.

As a result of extensive investigations, the inventors have discovered that an ionomeric resin composition obtained by compounding a material curable by exposure to, for example, sunlight, x-rays, ultraviolet light (UV), electron beams (EB) or a plasma arc (i.e., a UV/EB-curable material) with, in the presence of a peroxide and without carrying out exposure to sunlight, x-rays, ultraviolet light, electron beams or a plasma arc, the thermoplastic resin used in the present invention, then melt-blending the resulting mixture under applied heat with an ionomeric resin is capable of suppressing delamination when injection molded as a golf ball material. The inventors have also found that an ionomeric resin composition obtained by compounding the above UV/EB-curable material with, in the presence of a peroxide, a thermoplastic resin and an acid-containing polymer that is the base of an ionomeric resin so as to form an acid-containing polymer composition, then adding thereto a metal ionic species and carrying out an acid-neutralizing reaction, can serve as a golf ball material which suppresses delamination when injection molded.

In addition, the inventors have found that when an ionomeric resin composition prepared by including as one component therein a UV/EB-curable material in the absence of a peroxide is subjected to prolonged aging for a period of about 5 days or more, the effects of the UV/EB-curable material emerge as a result of the automatic oxidative crosslinking of the UV/EB-curable material.

The inventors have additionally learned that such ionomeric resin compositions have a surprisingly good thermal stability, flow and processability and, when used as a golf ball component, are ideal materials for forming high-performance golf balls endowed with excellent properties such as flexibility, durability and scuff resistance without a loss of rebound.

From additional investigations, the inventors have also found that golf balls which include a molding of such a golf ball material as a component therein (here and below, "component" refers to the cover material in a two-piece solid golf ball composed of a core and a cover which encases the core, or to the cover material or intermediate layer material in a multi-piece solid golf ball composed of a core of at least one layer, at least one intermediate layer which encases the core, and a cover of at least one layer which encases the intermediate layer), have an excellent flexibility, durability and scuff resistance without a loss of rebound.

Accordingly, the present invention provides the following golf ball material, methods for preparing such a golf ball material, and golf ball which includes as a component therein a molding of such a golf ball material.

[I] Golf Ball Material

A golf ball material containing an ionomeric resin composition which includes the following components (i) to (iii):
(i) one or more compounds selected from among UV/EB-curable materials;
(ii) a non-ionomeric thermoplastic resin; and
(iii) an ionomeric resin.

[II] Methods for Preparing Golf Ball Materials

[1] A method for preparing a golf ball material, which method includes the steps of: initially melt-blending (i) at least one compound selected from among UV/EB-curable materials with (ii) a non-ionomeric thermoplastic resin; then adding (iii) an ionomeric resin or an ionomeric resin together with the acid-containing polymer base thereof and melt-blending so as to obtain an ionomeric resin composition.

[2] A method for preparing a golf ball material, which method includes the steps of: melt-blending (i) at least one compound selected from among UV/EB-curable materials with (ii) a non-ionomeric thermoplastic resin and (iii) the acid-containing polymer base of an ionomeric resin; then adding an oxygen-containing inorganic metal compound-type metal ionic species and carrying out an acid-neutralizing reaction while melt-blending so as to obtain an ionomeric resin composition.

[3] A method for preparing a golf ball material, which method includes the steps of: adding together (i) at least one compound selected from among UV/EB-curable materials, (ii) a non-ionomeric thermoplastic resin and (iv) a peroxide, and melt-blending at a temperature at which the peroxide does not decompose prematurely; then adding (iii) an ionomeric resin or an ionomeric resin and the acid-containing polymer base thereof and melt-blending at or above the temperature at which the peroxide decomposes so as to obtain an ionomeric resin composition having an interpenetrating polymer network (IPN) structure.

[4] A method for preparing a golf ball material, which method includes the steps of: adding together (i) at least one compound selected from among UV/EB-curable materials, (ii) a non-ionomeric thermoplastic resin, (iii) the acid-containing polymer base of an ionomeric resin, and (iv) a peroxide, and melt-blending at a temperature at which the peroxide does not decompose prematurely; then adding an oxygen-containing inorganic metal compound-type metal ionic species and melt-blending at or above the temperature at which the peroxide decomposes so as to both induce a grafting reaction on (i) the at least one compound selected from among UV/EB-curable materials and neutralize the acid within (iii) the acid-containing polymer of an ionomeric resin, and thereby obtain an ionomeric resin composition having an interpenetrating polymer network structure.

[III] Golf Balls

Golf balls which include as a component therein a molding made of any of the above golf ball materials. In particular, golf balls wherein any of the above golf ball materials is used as a cover material in a two-piece solid golf ball composed of a core and a cover which encases the core, or as a cover material or intermediate layer material in a multi-piece solid golf ball composed of a core of at least one layer, one or more intermediate layers which encases the core, and a cover of at least one layer which encases the intermediate layer.

The present invention uses any one of the following ionomer resin compositions (A) to (C).

Ionomeric Resin Composition (A)

An ionomeric resin composition (A) obtained by melt-blending under applied heat one or more compounds selected from among UV/EB-curable materials with, in the presence of a peroxide and without carrying out exposure to sunlight, x-rays, ultraviolet light, electron beams or a plasma arc, a non-ionomeric thermoplastic resin and an ionomeric resin, or the ionomeric resin and an acid-containing polymer of the base thereof.

Ionomeric Resin Composition (B)

An ionomeric resin composition (B) obtained by carrying out melt blending under applied heat using, instead of the above ionomer, an acid-containing polymer base of the ionomer at a temperature up to the decomposition temperature of the peroxide so as to prepare an acid-containing polymer composition, then carrying out an acid-neutralizing reaction using an oxygen-containing inorganic compound-type metal ionic species.

Ionomeric Resin Composition (C)

An ionomeric resin composition (C) obtained by aging rather than including a peroxide in above ionomeric resin composition (A) or (B).

The above ionomeric resin compositions (A) to (C) suppress delamination and have a good thermal stability, flow and processability during injection molding. Golf balls using such compositions exhibit a good performance, such as excellent flexibility, durability and scuff resistance, with no loss of rebound. The present invention provides methods for preparing such golf ball materials, and golf balls which include as a component therein moldings of such golf ball materials.

DETAILED DESCRIPTION OF THE INVENTION

The invention is described more fully below.

The golf ball material of the present invention includes an ionomeric resin composition composed of (i) one or more compounds selected from among UV/EB-curable materials, (ii) a non-ionomeric thermoplastic resin, (iii) an ionomeric resin, an ionomeric resin and/or an acid-containing polymer base of an ionomeric resin, or, instead of the ionomeric resin, an acid-containing polymer base of an ionomeric resin and an oxygen-containing inorganic metal compound, and (iv) a peroxide. Alternatively, the golf ball material includes an ionomeric resin composition composed of above ingredients (i), (ii) and (iii). The method for preparing such a golf ball material involves melt-blending (i) the above one or more compounds selected from among UV/EB-curable materials with (ii) the above non-ionomeric thermoplastic resin and (iv) the above peroxide at a temperature at which the peroxide does not decompose, then adding (iii) the above ionomeric resin so as to obtain a golf ball material which includes (A) an ionomeric resin composition of the invention as an essential ingredient. Alternatively, the method for preparing such a golf ball material involves adding together (i) the above one or more compounds selected from UV/EB-curable materials, (ii) the above non-ionomeric thermoplastic resin, (iii) the acid-containing polymer base of the above ionomeric resin instead of the ionomeric resin itself, and (iv) a peroxide; melt-blending the ingredients at or below a temperature at which the peroxide decomposes; then adding an oxygen-containing inorganic metal compound-type metal ionic species and melt-blending under applied heat at or above the temperature at which the peroxide decomposes so as to obtain a golf ball material which includes (B) an ionomeric resin composition of the invention as an essential ingredient.

Moreover, when a resin composition obtained by a procedure that does not involve adding a peroxide during the formulation of (A) or (B) is subjected to aging treatment, a golf ball material containing (C) an ionomeric resin composition of the invention is obtained.

The present invention relates to ionomeric resin systems, which generally have a poor compatibility with non-ionomeric thermoplastic resins. Specifically, it provides an ionomeric resin composition that includes a non-ionomeric thermoplastic resin, which ionomeric resin composition suppresses delamination during injection molding.

Moreover, this invention, the object of which is to prepare a golf ball material that, in an ionomeric resin composition containing therein a non-ionomeric thermoplastic resin, suppresses delamination during injection molding, has a good thermal stability, flow and processability and, when used in a particular layer of a golf ball, can be used to produce golf balls endowed with excellent flexibility, durability and scuff resistance without a loss of rebound, was arrived at based on the discovery that UV/EB-curable materials function as an excellent interphase crosslinking agent between ionomeric resins and thermoplastic resins.

UV/EB-curable materials are commonly used for topcoating the surface-most layer of a golf ball under exposure to, for example, x-rays, ultraviolet light (UV), electron beams (EB) or a plasma arc. However, the present invention is not an application of this type. Instead, it is intended to make it possible to carry out interphase crosslinking between a non-ionomeric thermoplastic resin and an ionomeric resin by, in the melt-blending of a non-ionomeric thermoplastic resin with an ionomeric resin in the presence of a peroxide, the concomitant use of a UV/EB-curable material having a skeletal structure similar to that of the non-ionomeric thermoplastic resin. That is, the inventors conceived of the idea of forming an interpenetrating polymer network structure, and have found that the resulting ionomeric resin composition (A) is useful as a golf ball material in which delamination during injection molding can be suppressed.

The inventors have also found that an ionomeric resin composition (B) with an interpenetrating polymer network (IPN) structure, obtained by compounding the above-described UV/EB-curable material, in the presence of a peroxide, with a non-ionomeric thermoplastic resin and the acid-containing polymer base of an ionomeric resin (i.e., one or more acid-containing polymers selected from the group consisting of olefin-unsaturated carboxylic acid copolymers, olefin-unsaturated carboxylic acid-unsaturated carboxylic acid ester terpolymers, unsaturated carboxylic anhydride-containing polymers, unsaturated dicarboxylic acid-containing polymers and unsaturated dicarboxylic acid half ester-containing polymers) to form an acid-containing polymer composition, then melt-blending into the acid-containing polymer composition an oxygen-containing inorganic metal compound-type metal ionic species so as to induce both a grafting reaction on the UV/EB-curable material and also an acid-neutralizing reaction by the metal ionic species, is useful as a golf ball material in which delamination during injection molding is suppressed.

The inventors have additionally found that an ionomeric resin composition (C) obtained by subjecting a resin blend formulated in the same way as above ionomeric resin composition (A) or (B), but without a peroxide, to aging treatment is useful as a golf ball material in which delamination during injection molding is suppressed.

Because the UV/EB-curable material having a skeletal structure similar to the skeletal structure of the non-ionomeric thermoplastic resin used in the invention further improves the compatibility with non-ionomeric thermoplastic resins, the inventors have found that, as a result, a golf ball material containing an ionomeric resin composition having a more uniform IPN structure can be obtained.

In the present invention, by including a UV/EB-curable material in the ionomeric resin composition, non-ionomeric thermoplastic resin layers, which are incompatible or poorly compatible with ionomeric resin layers, can also be incorporated with good uniformity, thereby ultimately giving a golf ball material in which delamination is suppressed during injection molding, which has a good thermal stability, flow and processability, and which, when used in golf balls, exhibits excellent properties, such as durability, scuff resistance and flexibility, without a loss of rebound.

In the invention, if the UV/EB-curable material is not used in the non-ionomeric thermoplastic resin-containing ionomeric resin composition preparing step, delamination will usually tend to arise when injection molding is carried out. On the other hand, using an excess amount of the UV/EB-curable material will lead to gel formation, making the ionomeric resin composition non-uniform, and ultimately preventing the physical properties that are the object of the inventive golf ball material from being achieved.

In the practice of the invention, a UV/EB-curable material, a peroxide, a non-ionomeric thermoplastic resin and an ionomeric resin are melt-blended in the non-ionomeric thermoplastic resin-containing ionomeric resin composition (A) preparing step. It is preferable to first melt-blend the UV/EB-curable material, the peroxide and the non-ionomeric thermoplastic resin in a temperature range at which the peroxide does not decompose, then add the ionomeric resin and melt-mix the components at or above the temperature at which the peroxide decomposes.

Alternatively, in the present invention, in the non-ionomeric thermoplastic resin-containing ionomeric resin composition (B) preparing step, by first melt-blending a UV/EB-curable material, a peroxide, a non-ionomeric thermoplastic resin and an acid-containing polymer base of an ionomeric resin in a temperature range at which the peroxide does not decompose, then adding an oxygen-containing inorganic metal compound-type metal ionic species and melt-blending at or above the peroxide decomposition temperature, an ionomeric resin composition having an IPN structure can be obtained as a result of both a grafting reaction on the UV/EB-curable material and an acid-neutralizing reaction by the metal ionic species.

In this case, the UV/EB-curable material, peroxide and non-ionomeric thermoplastic resin are first melt-blended in a temperature range at which the peroxide does not decompose, the acid-containing polymer is subsequently melt-blended in a temperature range at about which the peroxide does not decompose, then the oxygen-containing inorganic metal compound-type metal ionic species is added and melt-blended at or above the peroxide decomposition temperature.

Also, in the present invention, in the step of preparing the above-described ionomeric resin compositions (A) and (B), by not using a peroxide and subjecting the resin blend to aging treatment, it is possible to obtain an ionomeric resin composition (C) having resin properties similar to those of ionomeric resin compositions (A) and (B).

The aging treatment conditions include a temperature of from about 5° C. to about 80° C., preferably from about 10° C. to about 70° C., and more preferably from about 20° C. to about 60° C. The aging period is at least about 5 days, preferably at least about 7 days, and more preferably at least about 10 days, with the upper limit being about 100 days. The relative humidity during aging is from about 10% to about 80%, preferably from about 20% to about 70%, and even more preferably from about 30% to about 55%.

It is desirable for the UV/EB-curable material used in the present invention to be one having a skeletal structure similar to the skeletal structure of the non-ionomeric thermoplastic resin that is used. The compatibility between the UV/EB-curable material and the non-ionomeric thermoplastic resin can thus be further enhanced, enabling an ionomeric resin composition having a more uniform IPN structure to be obtained.

Examples of the one or more types of compound selected from among UV/EB-curable materials that may be used in the invention include, but are not limited to, materials in which a portion of the main-chain skeleton is selected from among polyester, polyether, urethane, acrylate, butadiene, epoxy, carbonate and rosin structures and which have at least two functional groups with an ethylenically unsaturated bond per molecule, the functional groups with an ethylenically unsaturated bond being polymerizable function groups of one or more types selected from among acrylic ($CH_2$=CHCO—), methacrylic ($CH_2$=C($CH_3$)CO—), allyl ($CH_2$=CHCH—) and vinyl ($CH_2$=CH—) groups.

Specific examples include polyester acrylates [EBECRYL 657 (four functional groups; about 125,000 mPa·sec/25° C.; number-average molecular weight Mn, about 1,500), EBECRYL 853 (three functional groups; about 80 mPa·sec/25° C.; Mn, about 470) and EBECRYL 1830 (six functional groups; about 50,000 mPa·sec/25° C.; Mn, about 1,500), all produced by Daicel-Cytec Co., Ltd.; and Aronix M6250 (two functional groups; about 500 Pa·sec/25° C.; number-average molecular weight Mn, about 1,000) produced by Toagosei Co., Ltd.]; polyether acrylates [BLEMMER-ADE600 (two functional groups; about 70 mPa·sec/25° C.; Mn, about 750) produced by NOF Corporation, and UV-6640B (two functional groups; about 20,000 mPa·sec/50° C.; Mn, about 5,000) produced by Nippon Synthetic Chemical Industry Co., Ltd.]; urethane acrylates [SHIKOH UV-7510B (three functional groups; about 2,000 mPa·sec/50° C.; Mn, about 3,500) and SHIKOH UV-7000B (three functional groups about 25,000 mPa·sec/50° C.; Mn, about 3,500), both produced by Nippon Synthetic Chemical Industry Co., Ltd.; and Ebecryl 270 (two functional groups; about 3,000 mPa·sec/50° C.; Mn, about 1,500) produced by CYTEC]; epoxy (bisphenol A) acrylates [V #700 (two functional groups; about 1,000 Pa·sec/25° C.; Mn, about 500) and V #540 (two functional groups; about 15,000 mPa·sec/50° C.; Mn, about 540), both produced by Osaka Organic Chemical Industry, Ltd.]; carbonate acrylates [UV-3210EA (two functional groups; about 3,000 mPa·sec/25° C.; Mn, about 9,000) and UV-3310B (two functional groups; about 55,000 mPa·sec/50° C.; Mn, about 5,000), both produced by Nippon Synthetic Chemical Industry Co., Ltd.]; butadiene acrylates [BAC-45 (two functional groups; about 4,500 mPa·sec/25° C.; Mn, about 3,000) produced by Osaka Organic Chemical Industry, Ltd.]; rosin acrylates [BEAMSET 102 (three functional groups; about 35,000 mPa·sec/40° C.; Mn, about 5,000) produced by Arakawa Chemical Industries, Ltd.; and BANBEAM UV-22A (three functional groups; about 530,000 mPa·sec/25° C.; Mn, about 5,000) and BANBEAM UV-22C (three functional groups; about 120,000 mPa·sec/25° C.; Mn, about 5,000), both produced by Harima Chemicals, Inc.]; polyether allyls [Polyglycol AA600 (two functional groups; about 27,000 mPa·sec/20° C.; Mn, about 600) and Polyglycol AAl200 (two functional groups; about 41,000 mPa·sec/20° C.; Mn, about 1,200), both produced by Clariant]; and polyether vinyls [TEGVE (two functional groups; about 3.4 mPa·sec/25° C.; Mn, 202) produced by Nippon Carbide Industries Co., Inc.].

The amount of the above UV/EB-curable material included per 100 parts by weight of the combined amount of the non-ionomeric thermoplastic resin and the ionomeric resin or the acid-containing polymer that is the base resin thereof, is from 0.05 to 30 parts by weight, preferably from 0.1 to 20 parts by weight, and more preferably from 0.5 to 10.0 parts by weight. If too much UV/EB-curable material is included, the resulting ionomeric resin composition may exhibit a dramatic decline in melt flow rate (MFR) and undergo gel formation, making it impossible to obtain a normal molded piece. Conversely, if too little is added, the resulting ionomeric resin composition may give rise to delamination during injection molding, possibly leading to a poor scuff resistance and a low rebound, and thus having an adverse influence on the properties of the golf ball obtained as the finished product.

The peroxide used together with the above UV/EB-curable material may be suitably selected with reference to the decomposition temperature thereof and the melting temperature at which the non-ionomeric thermoplastic resin employed is capable of being kneaded. Specifically, use is typically made of one or more peroxides selected from among dicumyl peroxide (one-minute half-life temperature, 175° C.), di-t-butyl peroxide (185° C.), 2,5-dimethyl-2,5-di(t-butylperoxy)-3-hexyne (194° C.), n-butyl-4,4-di(t-butylperoxy)valerate (173° C.), di(2-t-butylperoxyisopropyl) benzene (175° C.), di-t-hexyl peroxide (177° C.) and p-menthanehydroperoxide (200° C.). It is desirable to set the amount of the peroxide included, per 100 parts by weight of the combined amount of the non-ionomeric thermoplastic resin and the ionomeric resin and/or the acid-containing polymer base thereof, at preferably from 0.05 to 20 parts by weight, more preferably from 0.08 to 15 parts by weight, even more preferably from 0.1 to 10 parts by weight, and most preferably from 0.5 to 5.0 parts by weight.

The non-ionomeric thermoplastic resin used in the invention may be one or more selected from among polyolefin elastomers (including polyolefins and metallocene-catalyzed polyolefins), polystyrene elastomers, polyacrylate polymers, polyamide elastomers, polyurethane elastomers, polyester elastomers and polyacetals. Illustrative examples include polyethylene methacrylate, maleic anhydride-grafted polyethylene ethyl acrylate, hexamethylene diisocyanate (HDI)-poly-ε-caprolactone (PCL), 4,4'-dicyclohexylmethane diisocyanate (H12-MDI)-polytetramethylene glycol (PTMG), polystyrene-butylene, polybutylene terephthalate, polyether polyamide and polyoxymethylene. The weight ratio (non-ionomeric thermoplastic resin/ionomeric resin or the acid-containing polymer base thereof) is preferably from 1/99 to 99/1, more preferably from 5/95 to 95/5, and even more preferably from 10/90 to 90/10.

The ionomer resin used in the invention may be one or more ionomer resins obtained by neutralizing, within a degree of neutralization range of from 5 to 90 mol %, one or more polymers having an acid content of from 0.5 to 30 wt %, preferably from 1.0 to 25 wt %, and selected from among olefin-unsaturated carboxylic acid copolymers, olefin-unsaturated carboxylic acid-unsaturated carboxylic acid ester terpolymers, unsaturated carboxylic anhydride-containing polymers, unsaturated dicarboxylic acid-containing polymers, and unsaturated dicarboxylic acid half ester-containing polymers with one or more metal cations selected from among groups IA, IB, IIA, IIB, IIIA, IIIB, IVA, IVB, VA, VB, VIA, VIB, VIIB AND VIIIB of the periodic table.

Specific examples include 60 mol % Zn (degree of neutralization with zinc)-polyethylene-methacrylic acid copolymers, 40 mol % Mg (degree of neutralization with magnesium)-polyethylene-methacrylic acid copolymers, and 40 mol % Mg (degree of neutralization with magnesium)-polyethylene-methacrylic acid-isobutylene acrylate terpolymers.

In the present invention, in cases where the non-ionomeric thermoplastic resin has basic functional groups such as amino groups or imino groups, to avoid the reaction of a dicarboxylic acid or an acid anhydride thereof with the basic functional groups, preferred use may be made of, as the acid-containing polymer base of the above-described ionomeric resin, a polymer containing an acid (e.g., carboxylic acid) other than a dicarboxylic acid or acid anhydride thereof. Such a polymer is exemplified by an olefin-unsaturated carboxylic acid copolymer having an acid content of from 0.5 to 30 wt %, and preferably from 1.0 to 25 wt %. The number of carbons on the olefin is generally at least 2 and not more than 8, preferably not more than 6. Illustrative examples of such olefins include ethylene, propylene, butene, pentene, hexene, heptene and octene. The use of ethylene is especially preferred. Illustrative examples of the unsaturated carboxylic acid include acrylic acid, methacrylic acid, dimethylacrylic acid and ethacrylic acid. The use of acrylic acid or methacrylic acid is especially preferred.

Alternatively, an olefin-unsaturated carboxylic acid-unsaturated carboxylic acid ester terpolymer may be used as the polymer containing an acid other than a dicarboxylic acid or acid anhydride thereof. The unsaturated carboxylic acid ester is preferably a lower alkyl ester of an unsaturated carboxylic acid. For example, use may be made of one or more selected from among methyl methacrylate, ethyl methacrylate, propyl methacrylate, butyl methacrylate, methyl acrylate, ethyl acrylate, propyl acrylate and butyl acrylate. The use of butyl acrylate (n-butyl acrylate, isobutyl acrylate) is especially preferred. The content, expressed as a weight ratio (non-ionomeric thermoplastic resin/acid-containing polymer), is typically from 1/99 to 99/1, preferably from 5/95 to 95/5, and more preferably from 10/90 to 90/10.

In the invention, the acid-containing polymer composition prepared from the one or more compounds selected from among UV/EB-curable materials, the peroxide, the non-ionomeric thermoplastic resin and the acid-containing polymer base of an ionomeric resin is subjected to an acid-neutralizing reaction with a metal ionic species, enabling an ionomeric resin composition having an IPN structure to be obtained. The oxygen-containing inorganic metal compound-type metal ionic species used at this time is one or more selected from the group consisting of lithium carbonate, sodium carbonate, potassium carbonate, magnesium carbonate, zinc carbonate, magnesium hydroxide, magnesium oxide, calcium hydroxide, calcium oxide and zinc oxide. It is preferable for these oxygen-containing inorganic metal compounds to be used in the form of nanoparticles or a masterbatch. The amount in which these metal ionic species are included (degree of neutralization) will vary with the acid content of the acid-containing polymer base of an ionomeric resin that is used, with the degree of neutralization being preferably from 1 to 95 mol %, more preferably from 5 to 90 mol %, and even more preferably from 10 to 80 mol %. If the degree of neutralization is too high, the flow properties of the ionomeric resin composition may deteriorate (i.e., the melt index may decrease), which may make injection molding difficult to carry out. Moreover, during injection molding, the heat generated by shear may increase, causing thermal degradation and delamination of the non-ionomeric thermoplastic resin included within the ionomeric resin composition. Conversely, if the degree of neutralization is too low, although the composition will have flow properties, due to a decline in the degree of ionic crosslinking, the mechanical strength of the ionomeric resin composition itself may decrease, possibly leading to a decline in ball strength and a low durability when the composition is used as a golf ball material.

It is desirable for the acid-neutralizing reaction on the acid-containing polymer composition by the oxygen-containing inorganic metal compound-type metal ionic species to be carried out using a vented twin-screw extruder having arranged thereon a screw segment with a kneading disc zone.

Where appropriate for the intended use, optional additives may be included in the golf ball material of the invention. When the golf ball material of the invention is to be used as a cover material, in addition to the essential ingredients described above, additives such as pigments, dispersants, antioxidants, ultraviolet absorbers and light stabilizers may also be included. Such additives are included in an amount, per 100 parts by weight of the essential ingredients, of preferably at least 0.1 part by weight, and more preferably at least 0.5 part by weight, but preferably not more than 10 parts by weight, and more preferably not more than 4 parts by weight.

The golf ball material of the invention has a specific gravity of preferably at least 0.9, more preferably at least 0.92, and even more preferably at least 0.94, but preferably not more than 1.3, more preferably not more than 1.2, and even more preferably not more than 1.05.

Moldings obtained using the inventive golf ball material have a Shore D hardness of preferably at least 40, and more preferably at least 45, but preferably not more than 75, and more preferably not more than 70. If the Shore D hardness is too high, there may be a marked decline in the feel of the resulting golf ball on impact. On the other hand, if the Shore D hardness is too low, the rebound of the ball may decrease.

The inventive golf ball material which is an ionomeric resin composition may be used as the cover material in a two-piece solid golf ball composed of a core and a cover encasing the core, or as the cover material or intermediate layer material in a multi-piece solid golf ball composed of a core of at least one layer, one or more intermediate layers which encases the core, and a cover of at least one layer which encases the intermediate layer.

In the inventive golf ball material and method of preparation thereof, the principal component is either (1) an ionomeric resin composition obtained by melt-blending under applied heat one or more compounds selected from among UV/EB-curable materials with, in the presence or absence of a peroxide, a non-ionomeric thermoplastic resin and an ionomeric resin, or (2) an ionomeric resin composition having an IPN structure obtained by likewise melt-blending under applied heat one or more compounds selected from among UV/EB-curable materials with, in the presence or absence of a peroxide, a non-ionomeric thermoplastic resin, but using, instead of the ionomeric resin, an acid-containing polymer base of the ionomeric resin, then carrying out a reaction in which the acid is neutralized with a metal ionic species. As a result, when the golf ball material is injection-molded, delamination is suppressed and the golf ball material exhibits a good thermal stability, flow and processability, enabling high-performance golf balls endowed with excellent properties such as flexibility, durability and scuff resistance to be obtained.

EXAMPLES

Examples are given below by way of illustration and not by way of limitation. The twin-screw extruder used in the examples of the invention to carry out the reactions ("reaction twin-screw extruder") had a screw diameter of 32 mm, an overall L/D ratio of 41, and an L/D ratio for the kneading disc zone which was 40% of the overall L/D ratio. Moreover, the extruder had a vacuum vent port and was equipped with a device for injecting water under pressure. Material preparation was suitably carried out by using a 5-liter pressure kneader and pelletizing the resulting kneaded mass with a 40 mm diameter twin screw/single-screw extruder.

Example 1

An acid-containing polymer composition was obtained by first kneading the respective ingredients, including the UV/EB-curable material UV/EB-4 having a urethane skeleton (injected with a liquid feeder), but excluding the magnesium hydroxide masterbatch MgMB, within the twin-screw extruder in the proportions indicated in Table 1 and at a melting temperature at which the peroxide PO-3 does not decompose (170° C.). Next, the amount of MgMB shown in Table 1 was added to the acid-containing polymer composition, then both an acid-neutralizing reaction to 50 mol % neutralization of the acid-containing base resin included and decomposition of the PO-3 were carried out in the reaction twin-screw extruder at a temperature setting of 210° C., thereby giving a uniform ionomeric resin composition. The melt flow rate (MFR) and hardness of the resulting ionomeric resin composition are shown in Table 1.The ionomeric resin composition in this example had a suitable, low hardness and a melt flow rate appropriate for injection molding. Next, using this ionomeric resin composition as the cover material for two-piece golf balls, the composition was injection molded over a core of crosslinked butadiene rubber (core diameter, 38.9 mm; weight, 36.0 g; deflection, 3.35 mm) using an injection molding machine, thereby producing two-piece golf balls (diameter, 42.7 mm; weight, 45.5 g). The golf balls were then evaluated. The results are shown in Table 1. After injection molding, the golf balls were trimmed, yielding finished golf balls having a smooth surface free of burrs and endowed with good abrasion resistance, scuff resistance, ball durability, initial velocity and coefficient of restitution (COR).

The magnesium hydroxide masterbatch was prepared according to the method described in Japanese Patent Application No. 2005-227691. That is, a 5-liter pressure kneader (manufactured by Naniwa Machinery Manufacturing Co., Ltd.; temperature setting, 100° C.) was charged with a combined amount of 2.0 kg of Nucrel N0200H (an ethylene-methacrylic acid-isobutyl acrylate terpolymer produced by DuPont) as the base polymer for the masterbatch and magnesium hydroxide $Mg(OH)_2$ (average particle size, 0.8 μm; produced by Kyowa Chemical Industry Co., Ltd.) in a weight ratio (N0200H/$Mg(OH)_2$) of 50/50, and mixing was carried out for 20 minutes under an applied pressure of 0.49 MPa at a rotor speed of 35 rpm and at a mixing temperature controlled within a range of 120 to 130° C. The mixture was discharged as a strand from a 40 mm diameter twin-screw/single-screw extruder (Naniwa Machinery Manufacturing Co., Ltd.; temperature setting, 180° C.), then pelletized. The melt flow rate (MFR) of the resulting Magnesium hydroxide-containing masterbatch having a $Mg(OH)_2$ content of 50 wt % was 2.3 g/10 min (measured at 190° C. under a load of 2,160 g). This masterbatch is designated below as "MgMB."

Example 2

An acid-containing polymer composition was obtained by kneading the respective ingredients, including the UV/EB-curable material UV/EB-4 having a urethane skeleton (injected with a liquid feeder), but excluding the peroxide PO-3, within the twin-screw extruder in the proportions indicated in Table 1 and at a melting temperature of 170° C. Next, the amount of the MgMB shown in Table 1 was added to the acid-containing polymer composition, then an acid-neutralizing reaction to 50 mol % neutralization of the acid-containing base resin included was carried out in the reaction twin-screw extruder at a temperature setting of 210° C., thereby giving a uniform ionomeric resin composition. A hot press set to 180° C. was used to form the ionomeric resin composition into 2 mm thick sheets having a length of 100 mm and a width of 100 mm. In addition, the resulting ionomeric resin composition was subjected to the same procedure as in Example 1 and injection-molded in an injection molding machine, thereby producing two-piece golf balls. The sheets and the golf balls thus produced were held at rest under aging conditions of 23±5° C. and 45 to 55% relative humidity for 25 days, following which the various properties were evaluated. The results are shown in the table. The properties were substantially the same as in Example 1.

Example 3

A uniform ionomeric resin composition was obtained by first kneading the respective ingredients, including the UV/EB-curable material UV/EB-3 having a butadiene skeleton, but excluding nanoZnO, within a 5-liter pressure kneader in the proportions indicated in Table 1 and at a temperature (110° C.) at which the peroxide PO-2 does not decompose, then adding a predetermined amount of the nanoZnO shown in Table 1 to the resulting acid-containing polymer composition in which butadiene has been formulated and subsequently carrying out both an acid-neutralizing reaction to 35 mol % neutralization of the acid-containing base resin included and decomposition of the PO-2 at a temperature of 170° C. The melt flow rate and hardness of the resulting ionomeric resin composition are shown in Table 1.These results indicate that the ionomeric resin composition had a suitable, low hardness and a melt flow rate appropriate for injection molding. This ionomeric resin composition was subjected to the same golf ball injection molding procedure as in Example 1, thereby producing two-piece golf balls. The injection-molded golf balls were trimmed, yielding finished golf balls having a smooth surface free of burrs and endowed with good abrasion resistance, scuff resistance, ball durability, initial velocity and coefficient of restitution (COR).

Example 4

An acid-containing polymer composition was obtained by kneading the respective ingredients, including the UV/EB-curable material UV/EB-2 having a polyether skeleton (using a liquid feeder), but excluding nanoZnO, within the twin-screw extruder in the proportions indicated in Table 1 and at a melting temperature (170° C.) at which the peroxide PO-1 does not decompose. Next, the amount of the nanoZnO shown in Table 1 was added to the acid-containing polymer composition, following which both an acid-neutralizing reaction to 60 mol % neutralization of the acid-containing base resin included and decomposition of the PO-1 were carried out in the reaction twin-screw extruder at a temperature setting of 210° C., thereby giving a uniform ionomeric resin composition. The melt flow rate and hardness of the ionomeric resin composition thus obtained are shown in Table 1.These results indicate that the ionomeric resin composition had a suitable, high hardness and a melt flow rate appropriate for injection molding. This ionomeric resin composition was subjected to the same golf ball injection molding procedure as in Example 1, thereby producing two-piece golf balls. The injection-molded golf balls were trimmed, yielding finished golf balls having a smooth surface free of burrs and endowed with good abrasion resistance, scuff resistance, ball durability, initial velocity and coefficient of restitution (COR).

Example 5

An acid-containing polymer composition was obtained by mixing the respective ingredients, including the UV/EB-curable material UV/EB-1 having a polyester skeleton (using a liquid feeder), but excluding nanoZnO, within the twin-screw extruder in the proportions indicated in Table 1 and at a melting temperature (180° C.) at which the peroxide PO-3 does not decompose. Next, the amount of the nanoZnO shown in Table 1 was added to the acid-containing polymer composition, following which both an acid-neutralizing reaction to 45 mol % neutralization of the acid-containing base resin included and decomposition of the PO-1 were carried out in the reaction twin-screw extruder at a temperature setting of 210° C., thereby giving a uniform ionomeric resin composition. The melt flow rate and hardness of the ionomeric resin composition thus obtained are shown in the table. These results indicate that the ionomeric resin composition had a suitable, moderate hardness and a melt flow rate appropriate for injection molding. This ionomeric resin composition was subjected to the same golf ball injection molding procedure as in Example 1, thereby producing two-piece golf balls. The injection-molded golf balls were trimmed, yielding finished golf balls having a smooth surface free of burrs and endowed with good abrasion resistance, scuff resistance, ball durability, initial velocity and coefficient of restitution (COR).

Comparative Example 1

As a comparative example for Example 1 of the invention, an ionomeric resin composition was prepared by mixing the respective ingredients, except for the UV/EB-curable material UV/EB-4 having a urethane skeleton, in the proportions shown in Table 1 and using the same procedure as in Example 1, following which two-piece golf balls were produced. After injection molding, the golf balls were trimmed, yielding finished golf balls having a smooth surface free of burrs and a good abrasion resistance. However, compared with Example 1 of the invention in which the UV/EB-curable material UV/EB-4 having a urethane skeleton was included, the ball tended to have an inferior scuff resistance, ball durability, initial velocity and coefficient of restitution. This demonstrated the importance of including a UV/EB-curable material.

Comparative Example 2

In this example, carried out as a comparative example for Example 3 of the invention, the reaction twin-screw extruder (temperature setting, 210° C.) was used to neutralize a base resin (Base Resin-2) with nanoZnO in the ingredient amounts shown in Table 1, excluding the UV/EB-curable material UV/EB-3 having a butadiene skeleton, thereby forming a zinc ionomer having a degree of neutralization of 35 mol %. Next, using a 5-liter pressure kneader set to the PO-2 decomposition temperature (170° C.), the zinc ionomer, butadiene rubber and the peroxide PO-2 were melt-blended in the amounts shown in Table 1, thereby giving an ionomeric resin composition. Using this ionomeric resin composition, golf balls were injection-molded in the same way as in Example 1, thereby giving two-piece golf balls. The injection-molded golf balls were trimmed, yielding finished golf balls which had burrs thereon (coarse surface) and, compared with Example 3, had a markedly decreased ball durability and a lower initial velocity and coefficient of restitution. In contrast with Example 3 of the invention, a melt blend composed of an ionomer and butadiene rubber was prepared in this comparative example. As a result, an IPN structure was difficult to form by the procedure of Example 3 and a UV/EB-curable material was not included. Hence, the golf ball properties were inferior.

Comparative Example 3

In this example, carried out as a comparative example for Example 4 of the invention, an ionomeric resin composition was prepared by mixing the respective ingredients, except for the UV/EB-curable material UV/EB-2 having a polyether skeleton and the peroxide PO-1, in the proportions shown in Table 1 and using the same procedure as in Example 4, following which two-piece golf balls were produced. After injection molding, the golf balls were trimmed, yielding finished golf balls having a smooth surface free of burrs and a good abrasion resistance. However, compared with Example 4 of the invention in which the UV/EB-curable material UV/EB-2 having a polyether skeleton and the peroxide PO-1 were included, the ball tended to have an inferior scuff resistance, ball durability, initial velocity and coefficient of restitution. This demonstrated the importance of including a UV/EB-curable material and a peroxide.

TABLE 1

| Items | Example | | | | | Comparative Example | | |
|---|---|---|---|---|---|---|---|---|
| | 1 | 2* | 3 | 4 | 5 | 1 | 2 | 3 |
| i) UV/EB-curable agents | | | | | | | | |
| UV/EB-1 | — | — | — | — | 1.5 | — | — | — |
| UV/EB-2 | — | — | — | 0.5 | — | — | — | — |
| UV/EB-3 | — | — | 1.0 | — | — | — | — | — |
| UV/EB-4 | 1.5 | 1.5 | — | — | — | — | — | — |
| ii) Peroxides | | | | | | | | |
| PO-1 | — | — | — | 0.20 | — | — | — | — |
| PO-2 | — | — | 1.0 | — | — | — | 1.0 | — |
| PO-3 | 0.25 | — | — | — | 0.15 | 0.25 | — | — |
| iii) Non-ionomers | | | | | | | | |
| TPEE | — | — | — | — | 8.5 | — | — | — |
| POM | — | — | — | 4.5 | — | — | — | 5.0 |
| BR | — | — | 9.0 | — | — | — | 10.0 | — |
| TPU | 18.5 | 18.5 | — | — | — | 20.0 | — | — |

TABLE 1-continued

|  | Example | | | | | Comparative Example | | |
| --- | --- | --- | --- | --- | --- | --- | --- | --- |
| Items | 1 | 2* | 3 | 4 | 5 | 1 | 2 | 3 |
| iv) Ionomers & Base resins | | | | | | | | |
| Ionomer-1 | — | — | — | — | 40 | — | — | — |
| Ionomer-2 | — | — | — | 50.0 | — | — | — | 50.0 |
| Ionomer-3 | 5.0 | 5.0 | — | — | — | 5.0 | — | — |
| Base resin-1 | — | — | — | 45.0 | 40 | — | — | 45.0 |
| Base resin-2 | — | — | 90.0 | — | — | — | 90.0 | — |
| Base resin-3 | 10.0 | 10.0 | — | — | — | 10.0 | — | — |
| Base resin-4 | 15.0 | 15.0 | — | — | — | 15.0 | — | — |
| Base resin-5 | 25.0 | 25.0 | — | — | 10.0 | 25.0 | — | — |
| Base resin-6 | 25.0 | 25.0 | — | — | — | 25.0 | — | — |
| v) Cationic sources | | | | | | | | |
| nanoZnO | — | — | 3.0 | 1.9 | 1.45 | — | 3.0 | 1.9 |
| MgMB | 3.65 | 3.65 | — | — | — | 3.65 | — | — |
| vi) Filler & Pigment | | | | | | | | |
| Titanium dioxide | 1.5 | 1.5 | — | 2.0 | 2.0 | 1.5 | — | 2.0 |
| Blue pigment | 0.07 | 0.07 | — | 0.02 | 0.02 | 0.07 | — | 0.02 |
| Specific gravity | 0.994 | 0.994 | 0.953 | 0.994 | 0.974 | 0.994 | 0.953 | 0.994 |
| MFR (g/10 min at 190° C., 2160 g) | 1.1 | 1.2 | 8.3 | 1.6 | 2.0 | 1.5 | 10.1 | 2.1 |
| Hardness (Shore D) | 52 | 52 | 54 | 65 | 61 | 52 | 54 | 64 |
| Deflection (mm) at 23° C. | 3.06 | 3.07 | 2.89 | 2.72 | 2.26 | 3.06 | 2.87 | 2.74 |
| Initial velocity (m/sec) at 23° C. | 77.53 | 77.51 | 77.57 | 77.51 | 77.43 | 75.38 | 76.42 | 77.23 |
| Average C.O.R | 0.745 | 0.744 | 0.771 | 0.798 | 0.792 | 0.739 | 0.768 | 0.791 |
| Shot number (Durability) | 204 | 211 | 116 | 122 | 290 | 106 | 22 | 90 |
| Scuff resistance at 23° C. | 2 | 2 | 2 | 2 | 2 | 3 | 4 | 3 |
| Abrasion resistance (Sand) | Good | Good | Good | Good | Good | Good | Poor | Good |
| GB surface after trimming | Smooth | Smooth | Smooth | Smooth | Smooth | Smooth | Rough | Smooth |

*25-day aging time

The materials appearing in the above table are explained below.

a. UV/EB-1

Aronix M6250 (a polyester-based acrylate having two functional groups; about 500 mPa·sec/25° C.; number-average molecular weight, about 1,000), produced by Toagosei Co., Ltd.

b. UB/EB-2

TEGVE (a polyether-based vinyl having two functional groups; about 3.4 mPa·sec/25° C.; number-average molecular weight, about 202), produced by Nippon Carbide Industries Co., Inc.

c. UV/EB-3

BAC-45 (a butadiene-based acrylate having two functional groups; about 4,500 mPa·sec/25° C.; number-average molecular weight, about 3,000), produced by Osaka. Organic Chemical Industry, Ltd.

d. UV/EB-4

SHIKOH UV-7510B (a urethane-based acrylate having three functional groups; about 2,000 mPa·sec/50° C.; number-average molecular weight, about 3,500), produced by Nippon Synthetic Chemical Industry Co., Ltd.

e. PO-1

Di-t-butyl peroxide (1-minute half-life temperature, 185° C.), produced by NOF Corporation.

f. PO-2

Dicumyl peroxide (1-minute half-life temperature, 175° C.), produced by NOF Corporation.

g. PO-3

2,5-Dimethyl-2,5-di(t-butylperoxy)-3-hexane (1-minute half-life temperature, 194° C.), produced by NOF Corporation.

h. TPEE

Hytrel 4047 (polyester polyether, Shore D 40), produced by DuPont.

i. POM

AMILUS 5731 (polyacetal; MFR, 9.0 g/10 min; m.p., 166° C.), produced by Toray Industries, Inc.

j. BR

Maleic anhydride-modified BR01 (polybutadiene; cis-1,4-bond content, 96%; nickel polymerization catalyst; produced by JSR Corporation), a BSP experimental product.

k. TPU

5-Norbornene-2,3-dicarboxylic acid-modified aliphatic polyurethane (HMDI-PCL, produced by DIC-Bayer), a BSP experimental product.

l. Ionomer-1

S8527 (a sodium ionomer; Shore D 56), produced by DuPont.

m. Ionomer-2

S8940 (a sodium ionomer; Shore D 63), produced by DuPont.

n. Ionomer-3

S9945 (a zinc ionomer; Shore D 61), produced by DuPont.

o. Base Resin-1

Nucrel 960 (methacrylic acid, 15 wt %: MFR, 60 g/10 min), produced by DuPont.

p. Base Resin-2

Nucrel 2050H (methacrylic acid, 20 wt %: MFR, 500 g/10 min), produced by DuPont.

q. Base Resin-3

Nucrel 599 (methacrylic acid, 10 wt %: MFR, 500 g/10 min), produced by DuPont.

r. Base Resin-4

AC5120H (acrylic acid, 15.6 wt %: MFR, >500 g/10 min), produced by Tomen Plastics Corporation.

s. Base Resin-5

AN 4319 (methacrylic acid, 8.0 wt %: MFR, 50 g/10 min), produced by DuPont.

t. Base Resin-6

Escor 5200 (acrylic acid, 15.0 wt %: MFR, 36 g/10 min), produced by ExxonMobil Chemical.

u. nanoZnO

The zinc oxide NANOFINE-50 (average particle size, 20 nm; particle size distribution, 1 to 100 nm; proportion having a particle size of 0.05 μm or less, 60%), produced by Sakai Chemical Industry Co., Ltd.

v. MgMB

Magnesium hydroxide/ethylene-methacrylic acid-isobutyl acrylate terpolymer=50/50 wt %.

w. Titanium Dioxide

Tipaque PF737, produced by Ishihara Sangyo Kaisha.

x. Blue Pigment

Pigment Blue 29, produced by Toyo Ink.

The test items in the table are explained below.

MFR (g/10 min)

The melt flow rate was measured in accordance with JIS-K 7210 at a test temperature of 190° C. and a test load of 21.18 N (2.16 kgf).

Shore D Hardness

The Shore D hardness was measured in accordance with ASTM D-2240.

Deflection

The golf ball was placed on a steel plate and the deflection (mm) by the ball when compressed under a final load of 1,275 N (130 kgf) from an initial load of 98 N (10 kgf) was measured. The test was carried out at a temperature of 23±1° C.

Initial Velocity

The initial velocity was measured using an initial velocity measuring apparatus of the same type as the USGA drum rotation-type initial velocity instrument approved by the R&A. The ball was kept isothermally at a temperature of 23±1° C. for at least 3 hours, then tested at the same temperature.

The ball was hit using a 250-pound (113.4 kg) head (striking mass) at an impact velocity of 143.8 ft/s (43.83 m/s). Ten balls were each hit two times. The time taken by the ball to traverse a distance of 6.28 ft (1.91 m) was measured and used to compute the initial velocity of the ball. This cycle was carried out over a period of about 15 minutes.

Coefficient of Restitution (COR)

The ball was fired from an air cannon against a steel plate at a velocity of 43 m/s, and the rebound velocity was measured. The coefficient of restitution (COR) is the ratio of the rebound velocity to the initial velocity of the ball.

Shot Number (Durability)

The durability of the golf ball was evaluated using an ADC Ball COR Durability Tester produced by Automated Design Corporation (U.S.). A ball was fired using air pressure and made to repeatedly strike two metal plates arranged in parallel. The average number of shots required for the ball to crack was treated as its durability. Average values were obtained by furnishing four balls of the same type for testing, repeatedly firing each ball until it cracked, and averaging the number of shots required for the respective balls to crack. The type of tester used was a horizontal COR durability tester, and the incident velocity of the balls on the metal plates was 43 m/s.

Scuff Resistance

The golf balls were held at a temperature of 23±1° C. and hit at a head speed of 33 m/s using a pitching wedge mounted on a swing robot machine, after which damage from the impact was visually rated according to the following scale.

| | |
|---|---|
| Best: | 1 point |
| Better: | 2 points |
| Good (ordinary): | 3 points |
| Poor: | 4 points |
| Poorer: | 5 points |
| Poorest: | 6 points |

Abrasion Resistance

A tubular container having a five liter capacity was filled with 15 golf balls and 1.7 liters of sand, after which the contents were mixed at 50 rpm for 2 hours. The balls were then removed and, based on a visual determination of the extent of surface marring and decreased gloss due to abrasion, the abrasion resistance was rated as follows.

Best
Better
Good (ordinary)
Poor
Poorer
Poorest

Ball Appearance after Surface Abrasion

The injection-molded golf ball was surface abraded (trimmed) with a #500 grinding wheel for 3.5 seconds, following which the surface appearance of the ball was rated as follows.

Smooth
Less rough
Rough

The invention claimed is:

1. A method for preparing a golf ball material, comprising the steps of: initially melt-blending (i) at least one compound selected from among UV/EB-curable materials wherein a portion of a main-chain skeleton of the compound is selected from the group consisting of polyester, polyether, urethane, acrylate, butadiene, epoxy, carbonate and rosin structures, and which have at least two functional groups with an ethylenically unsaturated bond per molecule, the functional groups with an ethylenically unsaturated bond being polymerizable functional groups of one or more types selected from the group consisting of acrylic ($CH_2$=CHCO—), methacrylic ($CH_2$=C($CH_3$)CO—), allyl ($CH_2$=CHCH—) and vinyl ($CH_2$=CH—) groups with (ii) a non-ionomeric thermoplastic resin; then adding (iii) an ionomeric resin or an ionomeric resin together with the acid-containing polymer base thereof and melt-blending so as to obtain an ionomeric resin composition.

2. The method for preparing a golf ball material of claim 1, further comprising the step of subjecting the ionomeric resin composition to aging treatment.

3. The method for preparing a golf ball material of claim 2, wherein aging treatment is carried out under the following conditions: a temperature of from about 5° C. to about 80° C., and a period of standing of from about 5 days to about 100 days.

4. The method for preparing a golf ball material of claim 1, wherein the UV/EB-curable materials are selected from the group consisting of polyester acrylates, polyether acrylates, urethane acrylates, epoxy (bisphenol A) acrylates, carbonate acrylates, butadiene acrylates, rosin acrylates, polyether allyls and polyether vinyls.

5. A method for preparing a golf ball material, comprising the steps of: initially melt-blending (i) at least one compound selected from among UV/EB-curable materials wherein a portion of a main-chain skeleton of the compound is selected from the group consisting of polyester, polyether, urethane, acrylate, butadiene, epoxy, carbonate and rosin structures, and which have at least two functional groups with an ethylenically unsaturated bond per molecule, the functional groups with an ethylenically unsaturated bond being polymerizable functional groups of one or more types selected from the group consisting of acrylic ($CH_2$=CHCO—), methacrylic ($CH_2$=C($CH_3$)CO—), allyl ($CH_2$=CHCH—) and vinyl ($CH_2$=CH—) groups with (ii) a non-ionomeric thermoplastic resin; then adding (iii) the acid-containing polymer base of an ionomeric resin; then adding an oxygen-containing inorganic metal compound-type metal ionic species and carrying out an acid-neutralizing reaction while melt-blending so as to obtain an ionomeric resin composition.

6. The method for preparing a golf ball material of claim 2, wherein the UV/EB-curable materials are selected from the group consisting of polyester acrylates, polyether acrylates, urethane acrylates, epoxy (bisphenol A) acrylates, carbonate acrylates, butadiene acrylates, rosin acrylates, polyether allyls and polyether vinyls.

7. A method for preparing a golf ball material, comprising the steps of: adding together (i) at least one compound selected from among UV/EB-curable materials wherein a portion of a main-chain skeleton of the compound is selected from the group consisting of polyester, polyether, urethane, acrylate, butadiene, epoxy, carbonate and rosin structures, and which have at least two functional groups with an ethylenically unsaturated bond per molecule, the functional groups with an ethylenically unsaturated bond being polymerizable functional groups of one or more types selected from the group consisting of acrylic ($CH_2$=CHCO—), methacrylic ($CH_2$=C($CH_3$)CO—), allyl ($CH_2$=CHCH—) and vinyl ($CH_2$=CH—) groups, (ii) a non-ionomeric thermoplastic resin and (iv) a peroxide, and melt-blending at a temperature at which the peroxide does not decompose prematurely; then adding (iii) an ionomeric resin or an ionomeric resin and the acid-containing polymer base thereof and melt-blending at or above the temperature at which the peroxide decomposes so as to obtain an ionomeric resin composition having an interpenetrating polymer network (IPN) structure.

8. The method for preparing a golf ball material of claim 7, wherein the UV/EB-curable materials are selected from the group consisting of polyester acrylates, polyether acrylates, urethane acrylates, epoxy (bisphenol A) acrylates, carbonate acrylates, butadiene acrylates, rosin acrylates, polyether allyls and polyether vinyls.

9. A method for preparing a golf ball material, comprising the steps of: adding together (i) at least one compound selected from among UV/EB-curable materials wherein a portion of a main-chain skeleton of the compound is selected from the group consisting of polyester, polyether, urethane, acrylate, butadiene, epoxy, carbonate and rosin structures, and which have at least two functional groups with an ethylenically unsaturated bond per molecule, the functional groups with an ethylenically unsaturated bond being polymerizable functional groups of one or more types selected from the group consisting of acrylic ($CH_2$=CHCO—), methacrylic ($CH_2$=C($CH_3$)CO—), allyl ($CH_2$=CHCH—) and vinyl ($CH_2$=CH—) groups, (ii) a non-ionomeric thermoplastic resin, (iii) the acid-containing polymer base of an ionomeric resin, and (iv) a peroxide, and melt-blending at a temperature at which the peroxide does not decompose prematurely; then adding an oxygen-containing inorganic metal compound-type metal ionic species and melt-blending at or above the temperature at which the peroxide decomposes so as to both induce a grafting reaction on (i) the at least one compound selected from among UV/EB-curable materials and neutralize the acid within (iii) the acid-containing polymer base of an ionomeric resin, and thereby obtain an ionomeric resin composition having an interpenetrating polymer network structure.

10. The method for preparing a golf ball material of claim 9, wherein the oxygen-containing inorganic metal compound-type metal ionic species is one or more selected from the group consisting of lithium carbonate, sodium carbonate, potassium carbonate, magnesium carbonate, zinc carbonate, magnesium hydroxide, magnesium oxide, calcium hydroxide, calcium oxide and zinc oxide, and the oxygen-containing inorganic metal compound is used in the form of nanoparticles or a masterbatch.

11. The method for preparing a golf ball material of claim 9, wherein the acid-neutralizing reaction on the acid-containing polymer composition by the oxygen-containing inorganic metal compound-type metal ionic species is carried out using a vented twin-screw extruder having arranged thereon a screw segment with a kneading disc zone.

12. The method for preparing a golf ball material of claim 9, wherein the UV/EB-curable materials are selected from the group consisting of polyester acrylates, polyether acrylates, urethane acrylates, epoxy (bisphenol A) acrylates, carbonate acrylates, butadiene acrylates, rosin acrylates, polyether allyls and polyether vinyls.

* * * * *